Nov. 11, 1930.  A. G. M. MICHELL  1,781,068
FLUID MOTOR AND PUMP
Filed March 20, 1922   2 Sheets-Sheet 1
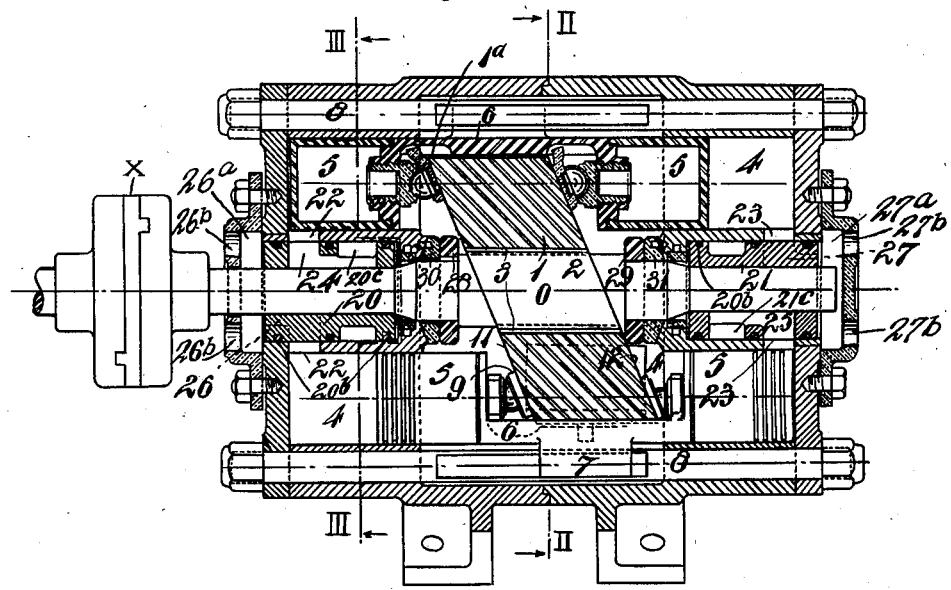
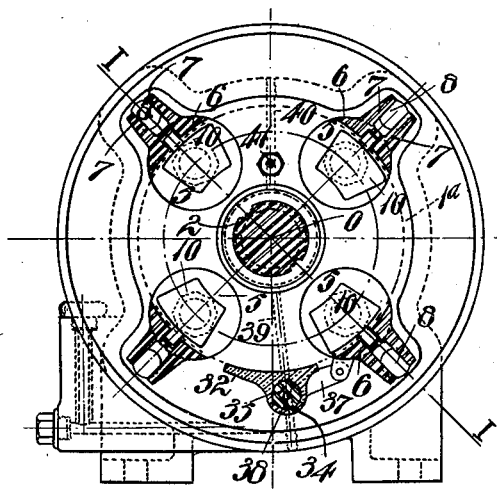 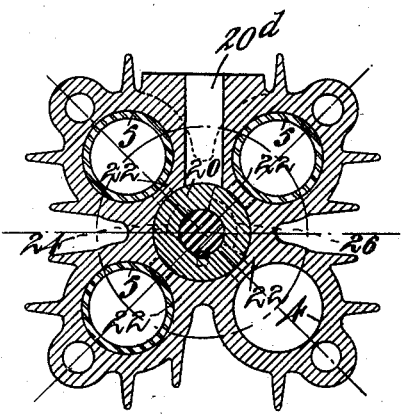
Inventor
Anthony G. M. Michell,
By [signature]
Atty Nov. 11, 1930.  A. G. M. MICHELL  1,781,068
FLUID MOTOR AND PUMP
Filed March 20, 1922  2 Sheets-Sheet 2
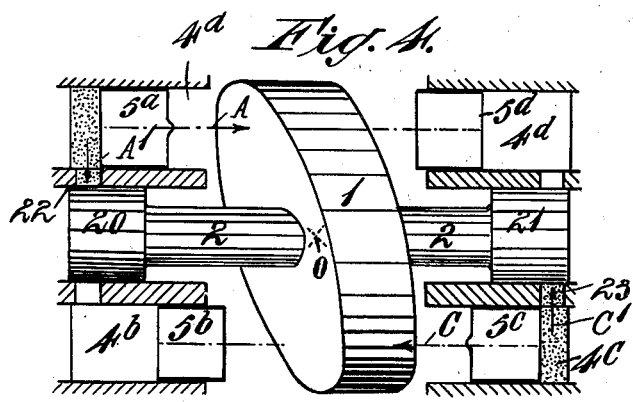
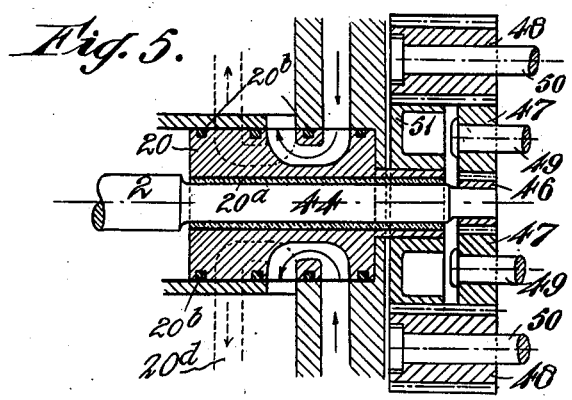
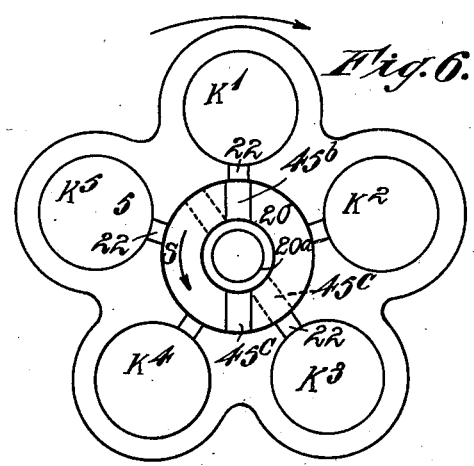
Inventor
Anthony G. M. Michell Patented Nov. 11, 1930

1,781,068

UNITED STATES PATENT OFFICE

ANTHONY GEORGE MALDON MICHELL, OF MELBOURNE, VICTORIA, AUSTRALIA, ASSIGNOR, BY MESNE ASSIGNMENTS, TO MICHELL-CRANKLESS ENGINES CORPORATION, OF NEW YORK, N. Y., A CORPORATION OF NEW YORK

FLUID MOTOR AND PUMP

Application filed March 20, 1922, Serial No. 545,193, and in Australia April 29, 1921.

The object of this invention is an improvement in motors and pumps employing the means for conversion of reciprocating and rotary motion which is described in the applicant's United States Patent 1,409,057.

The primary purpose of this invention is to effect a balance between the forces due to the working fluid which act upon the elements of the rotary member of the machine. Incidental to the provision of such balance the invention also involves as a secondary object the elimination of the unbalancing factor occasioned by the force of gravity when the shaft carrying the rotary member is positioned horizontally.

As described in the before mentioned patent specification such rotary member comprises a drive plate, or swash plate, (co-acting with reciprocating pistons), a shaft upon which the drive plate is mounted, and rotary valves, the last having the form of discs and being mounted rigidly or non-rigidly upon the said shaft, the whole arrangement having been devised to attain dynamic balance of the rotary member and the pistons.

The present invention comprises further developments whereby a balance is effected between the pressure exerted on the drive plate by the pistons and the fluid pressures acting upon the valves. As a result of such balance, the pressures between the rotary valves and their seats are obviated or greatly diminished, and the valves may readily be adapted to serve as bearings for the shaft without undue wear of the surfaces of the valves and seats, and by this combination of functions an essential simplification is effected in the construction of the machine with corresponding reduction of bulk and weight.

The accompanying drawings illustrate the improvements applied to a fluid motor or pump symmetrical at its two ends, and comprising four pairs of cylinders.

Fig. 1 is a longitudinal axial section of the complete machine on the line 1, 1 of Fig. 2;

Figs. 2 and 3 are respectively cross sections on lines 2, 2 and 3, 3 of Fig. 1.

Fig. 4 is a diagram of the forces which are balanced by the operation of the principle of the invention.

Fig. 5 shows modified means of constructing and operating the rotary valves while Fig. 6 shows a further modification applicable to an internal combustion engine.

In Fig. 1 the swash plate or slant collar 1 (hereinafter called the "slant") is shown secured on the rotating shaft 2 by means of the keys 3, 3. The working cylinders 4, 4 whose axes are parallel to that of the shaft 2, are shown in longitudinal section together with the double-ended pistons 5, 5.

The double-ended pistons 5, 5 are constructed in any manner suitable for the fluid and working cylinder employed. The two ends of each double piston are rigidly connected together by the central yoke 6 which may have projections 7 guided by fixed bolts or bars 8, or the like so as to prevent the piston from rotating while allowing it to reciprocate parallel to its axis.

In order to transmit motion from the slant 1 to the double pistons 5, 5 or vice versa, slippers 9, 10 are arranged one on each side of the slant 1 as shown, having working surfaces adapted to make lubricated contact with the corresponding surfaces 11, 12 of the slant. The latter is indicated by a dotted circle 1ª in Fig. 2, being removed to show slippers 10, and other parts more clearly. The surfaces 11, 12 and the corresponding working surfaces of the slippers 9, 10, are plane according to the above-cited patent.

The foregoing description of the cylinders, pistons, slippers and arrangement of same as illustrated is not to be regarded as limiting the scope of the present invention.

In the application of the latter, the valves 20 and 21 of the motor or pump as shown in Figs. 1 and 3, are of cylindrical form and are mounted rigidly on the shaft 2. The ports 22, 23 of the cylinders at each end of the machine respectively make communication at appropriate phases of the revolution with either the ports 24, 25 or the ports 26, 27 of the corresponding valves 20, 21. The ports 24, 25 may for instance be the admission ports and 26, 27 the exhaust ports of a fluid motor. The valve ports 26, 27 (which in the case of an air pump may be regarded as the intake ports, and in a motor as the exhaust ports) are in communication as shown in Fig. 1, with the spaces 26$^a$ and 27$^a$ and thence with the atmosphere through openings 26$^b$, 27$^b$. The pressure ports 24, 25, of the valves 20, 21 are in communication with annular passages 20$^c$, 21$^c$ and the latter are continuously in communication with the pressure passages in the casing, one of these pressure passages being in the plane of section III—III and shown at 20$^d$ Fig. 3. The rotary member is provided with thrust collars 28, 29 which respectively engage with thrust bearings 30, 31. In order that the pressures upon these bearings may not interfere with the balance of the rotating element, which is the primary object of the invention the seats of the bearings 30, 31 are preferably formed as segments of a sphere having its center at the center O of the rotary member. As shown in the drawings the rotating element has no journal bearings, the valves 20, 21 serving as such insofar as any bearings are requisite.

The purpose of making thrust bearings spherical is to allow the rotary member consisting of the slant 1, shaft 2, and valves 20 and 21, to rotate (to a small extent) in any direction about its centre O. By this arrangement forces indicated by the arrows, A, C, A$^1$, C$^1$ in Fig. 4, are enabled to establish mutual equilibrium between themselves, which would not be possible if the rotary element were restrained from rotating in the plane of the diagram, as by journal bearings or thrust-bearings not seated spherically about the centre O.

If journal bearings are employed, they also are preferably mounted or supported, so as to permit of rotation of the rotary member in any plane or direction about its centre of figure.

The lubrication of the mechanism is preferably effected by means of a pivoted pad 32 shown in Fig. 2 which is fitted in the lower part of the chamber containing the slant, and is mounted on a rotatable spindle 34 being either submerged in oil or supplied by splash lubrication in a well known way. The pad 32 has a working surface bearing upon the outer periphery 1$^a$ of the slant 1, and is caused to exert a determinate upward pressure upon the latter by being mounted on an eccentric 35 formed upon the spindle 34. The pad 32 is caused to reciprocate longitudinally on its spindle by being connected by means of the lug 37 with the adjacent piston yoke 6, and its working surface is thereby kept in proper relation with the external periphery 1$^a$ of the slant 1 during all phases of the rotation of the latter. A hole drilled through the working face of the pad 32 makes communication with a longitudinal passage 38 drilled in the spindle 34, (Fig. 2) and oil will flow from the passage 38 through the hole in pad 32 and through transverse passages 39 and 40 formed in the casing as indicated in dotted lines, the oil discharging from the transverse passage 40 through an opening 41 onto the slant thereby lubricating the slippers as well as the surfaces of the rotary valves and other parts requiring lubrication.

The construction being as above described, the fluid pressures which are exerted upon the rotating element effect a balance, as will be now explained in connection with Fig. 4, which is a diagrammatic axial section on the same plane as Fig. 1. The diagram illustrates the balance of the forces in this plane, a similar balance being produced between the forces in the axial plane at right angles to this.

The two half pistons 5$^a$, 5$^c$ shown in the section Fig. 4 being assumed to be making their pressure strokes, while the other two half pistons 5$^b$, 5$^d$ are making their exhaust or suction strokes the fluid in the cylinders 4$^a$, 4$^c$ will be under pressure, while the cylinders 4$^b$, 4$^d$ will be at approximately atmospheric pressure.

The pistons 5$^a$, 5$^c$ will consequently through their attached slippers (not shown in Fig. 4) exert forces on the slant as represented by the arrows A, C, these forces tending to rotate the rotary element, consisting of the slant 1, shaft 2, and valves 20, 21 in a clockwise direction.

At the same time fluid pressures, equivalent to resultant forces A$^1$, C$^1$, act upon the valves, 20, 21 over the portions of their surfaces exposed to the fluid under pressure by communication with the ports 22, 23, and these latter forces tend to rotate the rotary member in counter-clockwise direction. The area of the ports relatively to those of the cylinders, and to the distances of the lines of action of the forces A, C, A$^1$, C$^1$, from the centre O of the rotating element are so assigned that the moment of the fluid pressures A$^1$, C$^1$, is nearly, but not quite equal to the opposing moment of the forces A, C. In consequence of this small deficiency of the pressures A$^1$, C$^1$, the valves 20, 21 exert a small residual pressure on their seats adjacent to the ports 22, 23 thus sealing or securing fluid tightness around the ports. The areas upon which the fluid pressure acts are defined in an axial direction by the packing rings 20$^b$ see Figs. 1 and 5 and their extension in the circumferential direction is estimated by taking into account the pressures to effect such sealing.

Alternatively to the valves being mounted rigidly upon, and rotating with the shaft, they may rotate relatively thereto as illustrated in Figs. 5 and 6. According to this construction a journal 44 is formed on the shaft 2, and rotates in the valve 20, or in a bush 20$^a$ fixed therein. The valve 20 or bush 20$^a$ thus forms a bearing for the shaft 2.

In order to rotate the valve the shaft 2 has secured upon it a toothed pinion 46, which drives through a gear train, consisting of toothed wheels as 47 and 48, revolving upon fixed spindles 49 and 50, the gear wheel 51, which is secured to an extension of the valve. In order to balance the forces acting on the rotary member through the pinion 46 and wheel 51, the wheels 47, 48 may be in duplicate as shown.

It will be seen that by means of the gear train above described, the valve 20 is driven in the opposite direction to the shaft 2, and at reduced speed. The numbers of teeth on the gear wheels are so assigned that the appropriate ratio exists between the speeds of the valve and shaft, according to the cycle of the motor or pump. In certain cases it is advantageous to construct the valve with multiple ports, instead of the single pressure and atmospheric ports illustrated in Figs. 1 to 3. In Figs. 5 and 6 valves are shown having two symmetrically arranged pressure ports (full lines) and two atmospheric ports (dotted lines).

The balance of pressures takes place with the construction shown in Figs. 5 and 6 in a precisely similar manner to that already explained in connection with Fig. 4 with the difference that the fluid pressure exerted at the cylinder port is transmitted to the shaft through the bearing bush 20$^a$ and the film of lubricant between it and the journal 2. Fig. 6 which has a cross section corresponding to Fig. 3, shows a form of construction and method of applying a valve and valve gear such as are shown in Fig. 5, suitable for an internal combustion engine operating on a four stroke or "Otto" cycle. According to this construction the engine would have at each end 5 cylinders marked respectively K$^1$, K$^2$, K$^3$, K$^4$, and K$^5$ each having a port 22 opening into a central valve chamber, in which rotates the cylindrical valve 20, the latter being constructed with ports and bearing bush 20$^a$ as shown in longitudinal section in Fig. 5. According to the 4-stroke cycle of operation the cylinders would admit the explosive mixture in the order K$^1$, K$^3$, K$^5$, K$^2$, K$^4$, K$^1$, etc., the direction of rotation of the slant being in the direction of the arrow at the top of the figure. The valve 20 which rotates in the opposite direction to the slant, (as shown by the arrow "S") at ¼th of the speed of the slant admits the mixture through the port 45$^b$ into the cylinder K$^1$, as shown in the figure. When the slant has made ⅖ths of a revolution and the cylinder K$^3$ is in phase to admit the mixture, the port 45$^c$ moves from the position shown in full lines to that shown in dotted lines, and is thus enabled to effect such admission. A similar action proceeds with regard to all the other cylinders in sequential order.

In order that the balance of forces above provided for shall not be disturbed by stresses transmitted through the shaft of the machine from the belt or coupling by which it is driven, the latter may be of a jointed or flexible construction. For this purpose an Oldham coupling, as indicated at X in Fig. 1 is suitable, a coupling of this type being incapable, as well known, of transmitting forces transverse to its axis.

It is to be understood that the method of lubrication by means of the pad 32 may be supplemented or replaced by other usual or known means for effecting the lubrication of the machine.

For instance, a geared pump, as described in applicant's United States Patent 1,409,057, may be employed to inject oil through nozzles upon the faces of the slant. This oil being thrown outwards by the centrifugal force may supply the necessary lubrication of the pad 32, the latter being retained in order to apply an upward force equilibrating the weight of the rotating parts.

I claim:—

1. In a device of the character described, a shaft, a swash plate thereon, a plurality of angularly spaced cylinders parallel to said shaft and having suitable ports, pistons in the cylinders coacting with opposite sides of the shaft through said swash plate, and valves on the shaft controlling the distribution of fluid to and from the cylinders through the ports, said ports being dimensioned to obtain fluid pressure on said shaft through said valves substantially compensating the tilting moment exerted by the pistons on the swash plate and therethrough on the shaft and valves.

2. In a device of the character described, a shaft, a swash plate thereon, a plurality of angularly spaced pairs of cylinders parallel to said shaft and having suitable ports, pistons in the cylinders coacting with opposite sides of the shaft and said swash plate, and valves on the shaft controlling the distribution of fluid to and from the cylinders through the ports, said ports being dimensioned to obtain fluid pressure on said shaft through said valves substantially compensating the tilting moment exerted by the pistons on the swash plate and therethrough on the shaft and valves.

3. In a device of the character described, a shaft, a swash plate thereon, a plurality of angularly spaced pairs of cylinders parallel to the shaft and provided with ports, pistons in the cylinders coacting with opposite sides of the shaft and of the swash plate, in combination with rotary valves forming journal supports for the shaft and cooperating with the ports to control the passage of fluid to and from the cylinders, said ports being so arranged and dimensioned that pressure generated in any cylinder to cause a tilting moment upon the shaft in one direction through its piston and the swash plate will be simultaneously applied to the shaft to cause a tilting moment thereon in the opposite direction through the valve cooperating with said cylinder.

4. In a device of the character described, a shaft, a swash plate thereon, a plurality of angularly spaced pairs of cylinders parallel to the shaft and provided with ports, pistons in the cylinders coacting with opposite sides of the shaft and of the swash plate, in combination with rotary valves forming journal supports for the shaft and cooperating with the ports to control the passage of fluid to and from the cylinders, said ports being so arranged and dimensioned that pressure generated in angularly spaced cylinders on opposite sides of the swash plate to cause a tilting moment upon the shaft in one direction through the pistons therein and the swash plate, will be applied simultaneously to the shaft to cause a tilting moment thereon in the opposite direction through the valves cooperating with said cylinders.

Dated this 14th day of February, 1922.

ANTHONY GEORGE MALDON MICHELL.